United States Patent
Ziech (10) Patent No.: US 10,974,586 B2
(45) Date of Patent: Apr. 13, 2021

(54) SUSPENSION REAR AXLE COMPRISING TWO ELECTRIC MOTORS

(71) Applicant: DANA HEAVY VEHICLE SYSEMS GROUP, LLC, Maumee, OH (US)

(72) Inventor: James F. Ziech, Kalamazoo, MI (US)

(73) Assignee: Dana Heavy Vehicle Systems Group, LLC, Maumee, OH (US)

( * ) Notice: Subject to any disclaimer, the term of this patent is extended or adjusted under 35 U.S.C. 154(b) by 0 days.

(21) Appl. No.: 16/088,606

(22) PCT Filed: Mar. 28, 2017

(86) PCT No.: PCT/US2017/024567
§ 371 (c)(1),
(2) Date: Sep. 26, 2018

(87) PCT Pub. No.: WO2017/172788
PCT Pub. Date: Oct. 5, 2017

(65) Prior Publication Data
US 2019/0100095 A1 Apr. 4, 2019

Related U.S. Application Data

(60) Provisional application No. 62/314,352, filed on Mar. 28, 2016.

(51) Int. Cl.
*B60K 7/00* (2006.01)
*B60K 17/04* (2006.01)
(Continued)

(52) U.S. Cl.
CPC ............ *B60K 7/0007* (2013.01); *B60G 9/022* (2013.01); *B60K 17/043* (2013.01);
(Continued)

(58) Field of Classification Search
CPC .... B60K 7/0007; B60K 17/043; B60K 17/22; B60G 9/00; B60G 9/022; B60G 9/027; B60G 9/02; B60G 3/00
See application file for complete search history.

(56) References Cited

U.S. PATENT DOCUMENTS 2,753,190 A * 7/1956 Hooven ................. B60G 9/027
267/273
4,057,121 A 11/1977 Stedman
(Continued)

OTHER PUBLICATIONS

European Patent Office, International Search Report with Written Opinion issued in PCT/US2017/024567, dated Jun. 7, 2017, 12 pages, European Patent Office, Rijswijk, Netherlands.

*Primary Examiner* — Hau V Phan
(74) *Attorney, Agent, or Firm* — McCoy Russell LLP (57) ABSTRACT

An electric vehicle comprising a portal axle architecture. The electric vehicle having a frame. An axle assembly including a De Dion tube. A first wheel hub and a second wheel hub rotatably coupled with the De Dion tube. A suspension system coupled with the vehicle frame, the suspension system having at least one pair of trailing arms pivotally coupled with the vehicle frame and at least one pair of air springs. A first electric drive assembly in driving engagement with the first wheel hub, and a second electric drive assembly in driving engagement with the second wheel hub.

12 Claims, 4 Drawing Sheets

(51) Int. Cl.
*B60G 9/02* (2006.01)
*B60K 17/22* (2006.01)

(52) U.S. Cl.
CPC .. *B60G 2200/314* (2013.01); *B60G 2200/341* (2013.01); *B60G 2202/152* (2013.01); *B60G 2300/50* (2013.01); *B60K 17/22* (2013.01); *B60K 2007/0046* (2013.01); *B60K 2007/0061* (2013.01); *B60K 2007/0076* (2013.01)

(56) References Cited

U.S. PATENT DOCUMENTS

| | | | |
|---|---|---|---|
| 4,343,375 A | 8/1982 | Manning | |
| 4,362,221 A * | 12/1982 | Manning | B60G 5/005 180/297 |
| 4,529,223 A * | 7/1985 | Maebayashi | B60G 3/26 180/345 |
| 5,188,195 A * | 2/1993 | Haustein | B60G 11/465 180/353 |
| 5,873,586 A * | 2/1999 | Krimmell | B60G 3/00 280/124.113 |
| 5,921,338 A | 7/1999 | Edmondson | |
| 5,924,504 A | 7/1999 | Ruppert, Jr. | |
| 6,276,474 B1 * | 8/2001 | Ruppert | B60K 1/02 180/65.6 |
| 6,394,474 B1 * | 5/2002 | Warinner | B60G 9/02 267/263 |
| 6,904,988 B2 | 6/2005 | Harrup | |
| 7,198,130 B2 * | 4/2007 | Schimke | B60K 6/46 180/291 |
| 7,377,343 B2 * | 5/2008 | Adams, III | B60K 7/0007 180/65.6 |
| 7,866,423 B2 | 1/2011 | Ruppert | |
| 7,866,432 B2 | 1/2011 | Xie | |
| 7,959,168 B2 * | 6/2011 | Kiselis | B60G 7/005 280/124.106 |
| 8,490,992 B2 * | 7/2013 | Juriga | B60G 9/02 280/124.163 |
| 8,668,215 B2 * | 3/2014 | Juriga | B60G 11/113 280/124.174 |
| 8,882,120 B2 * | 11/2014 | Juriga | B60G 9/00 267/260 |
| 9,302,707 B2 | 4/2016 | Buschjohann | |
| 2003/0111280 A1 | 6/2003 | Platner | |
| 2010/0155168 A1 | 6/2010 | Mies | |
| 2011/0140388 A1 * | 6/2011 | Juriga | B60G 11/04 280/124.163 |
| 2011/0168468 A1 | 7/2011 | Taguchi | |
| 2011/0259657 A1 | 10/2011 | Fuechtner | |
| 2013/0062855 A1 * | 3/2013 | Juriga | B60G 17/023 280/124.174 |
| 2014/0284121 A1 | 9/2014 | Baek | |
| 2015/0251510 A1 * | 9/2015 | Murray | B60G 3/202 280/124.148 |

* cited by examiner

SUSPENSION REAR AXLE COMPRISING TWO ELECTRIC MOTORS

RELATED APPLICATIONS

The present application claims the benefit of U.S. Provisional Application No. 62/314,352 filed on Mar. 28, 2016, which is incorporated herein by reference in its entirety.

BACKGROUND

The present disclosure relates to an electric vehicle drivetrain architecture. Conventional electric drivetrain architecture for certain vehicles, such as mass transit vehicles, are heavy, voluminous, expensive, and complex. Additionally, conventional electric drivetrain architectures, as compared to conventional mechanical drivetrain architectures, are known to increase a vehicle's unsprung weight, decrease space available for drivetrain components, and decrease passenger envelope size.

It would be advantageous to develop an electric portal axle architecture that reduces unsprung weight, increases cost efficiency, and improves drivetrain packaging.

SUMMARY

The present disclosure provides an electric vehicle comprising a portal axle architecture. The electric vehicle having a frame and an axle assembly including a De Dion tube. A first wheel hub and a second wheel hub rotatably coupled with the De Dion tube. A suspension system coupled with the vehicle frame, the suspension system having at least one pair of trailing arms pivotally coupled with the vehicle frame and at least one pair of air springs. A first electric drive assembly in driving engagement with the first wheel hub, and a second electric drive assembly in driving engagement with the second wheel hub.

BRIEF DESCRIPTION OF THE SEVERAL VIEWS OF THE DRAWINGS

The accompanying drawings are incorporated herein as part of the specification. The drawings described herein illustrate embodiments of the presently disclosed subject matter, and are illustrative of selected principles and teaching of the present disclosure. However, the drawings do not illustrate all possible implementations of the presently disclosed subject matter, and are not intended to limit the scope of the present disclosure in any way.

DETAILED DESCRIPTION OF THE PREFERRED EMBODIMENTS

It is to be understood that the invention may assume various alternative orientations and step sequences, except where expressly specified to the contrary. It is also to be understood that the specific devices, assemblies, systems and processes illustrated in the attached drawings, and described in the following specification are simply exemplary embodiments of the inventive concepts defined herein. Hence, specific dimensions, directions or other physical characteristics relating to the embodiments disclosed are not to be considered as limiting, unless expressly stated otherwise. Also, although they may not be, like elements in various embodiments described herein may be commonly referred to with like reference numerals within this section of the application.

Embodiments of a portal axle architecture 100 are described herein. In certain embodiments described herein, the portal axle architecture 100 is utilized with an electric bus. In addition, the portal axle architecture 100 may have application in both light duty and heavy duty vehicles, mass transit vehicles, commercial vehicles, off-highway vehicles, and passenger vehicles. It would be understood by a person skilled in the art that the portal axle architecture 100 also has industrial, locomotive, military, agricultural, and aerospace applications.

Figure 1:
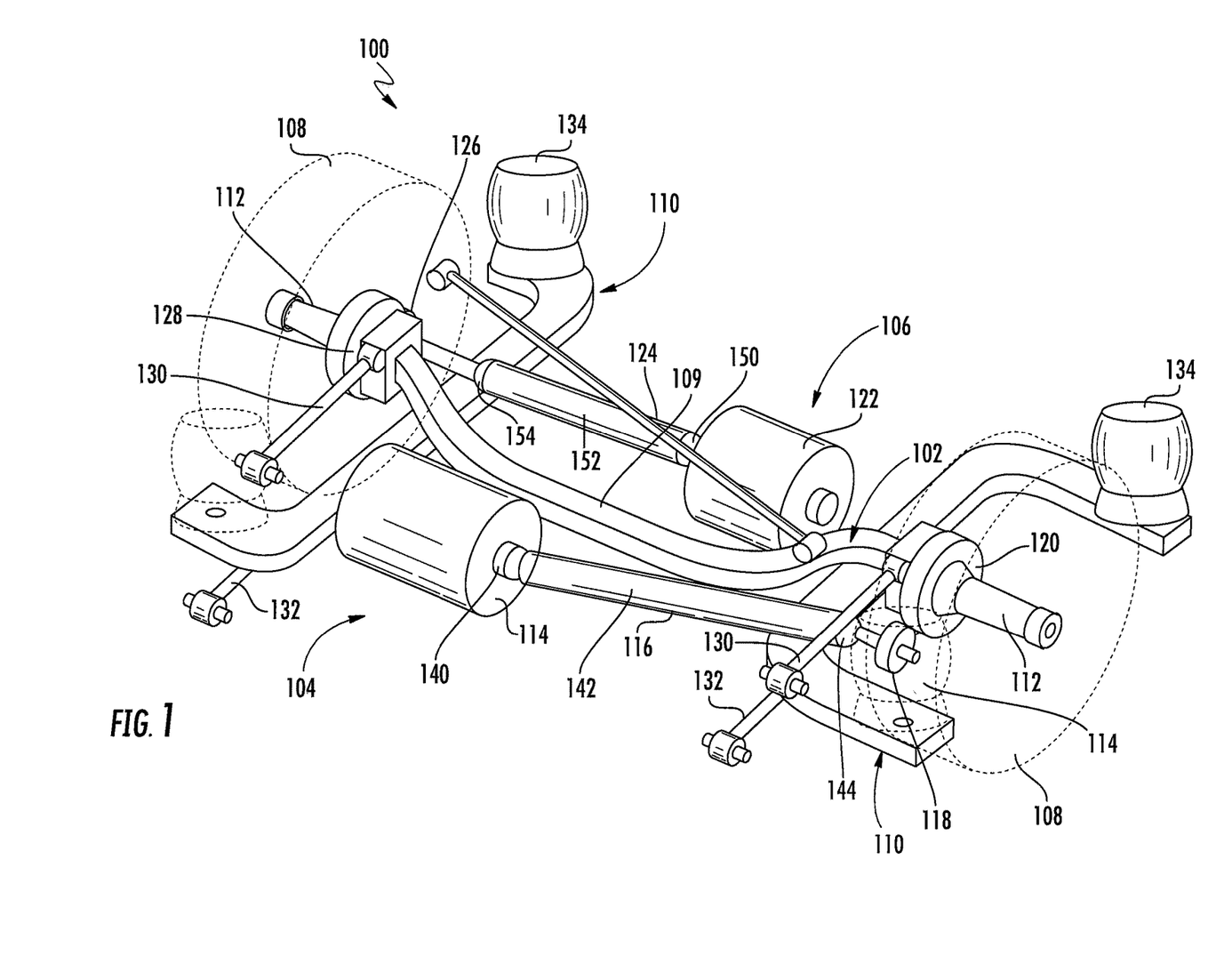
FIG. 1 is a perspective view of an electric portal axle architecture according to an embodiment of the presently disclosed subject matter.

As illustrated in FIG. 1, the portal axle architecture 100 comprises a De Dion axle assembly 102, a first electric drive assembly 104, and a second electric drive assembly 106. A pair of wheels 108 are rotatably coupled with the De Dion axle assembly 102. The wheels 108 are drivingly engaged with the first electric drive assembly 104 and the second electric drive assembly 106, respectively. The first electric drive assembly 104 and the second electric drive assembly 106 are in electrical communication with a control system (not depicted) and a power source (not depicted). The control system may be a drive control system for the portal axle architecture 100, or for the vehicle in which the portal axle architecture 100 is incorporated. The power source may be a battery or another source of electrical power.

The De Dion axle assembly 102 comprises a De Dion tube 109 fitted with a suspension system 110 and a pair of wheel hubs 112. Each of the wheel hubs 112 is rotatably mounted on an end of the De Dion tube 109 and provides a mounting location for each of the wheels 108. The suspension system 110 is a trailing arm suspension system including a first pair of trailing arms 130, a second pair of trailing arms 132, air springs 134, and a track rod 136, for example.

In an embodiment, the first trailing arms 130 are coupled with the De Dion axle assembly 102 at opposite ends thereof. The first trailing arms 130 may have a first end pivotally coupled with a portion (not depicted) of the De Dion axle assembly 102, and a second end pivotally coupled with a portion (not depicted) of the vehicle chassis. The second trailing arms 132 are also coupled with the De Dion axle assembly 102 at opposite ends thereof. The second trailing arms 132 may have a first end pivotally coupled with a portion (not depicted) of the De Dion axle assembly 102, and a second end pivotally coupled with a portion (not depicted) of the vehicle chassis. The first and second pairs of trailing arms 130, 132 are disposed generally parallel with a longitudinal axis of the vehicle. The second pair of trailing arms 132 is disposed below the first pair of trailing arms 130.

In the embodiment illustrated in FIG. 1, the trailing arms 130, 132 are generally utilized to control movement of the De Dion axle assembly 102 in a longitudinal direction. The track rod 136 is disposed generally transverse the longitudinal axis of the vehicle. The track rod 136 is pivotally coupled at a first end with the De Dion axle assembly 102. A second end of the track rod 136 is pivotally coupled with the vehicle chassis. The track rod 136 controls the lateral movement of the De Dion axle assembly 102.

The first electric drive assembly 104 comprises a first motor generator 114, a drive shaft 116, a drive pinion 118, and a drive gear 120. The first motor generator 114 is chassis mounted and an output thereof is drivingly engaged with the driveshaft 116, which is in turn drivingly engaged with the drive pinion 118. The drive gear 120 is coupled with the wheel hub 112. In addition, the drive gear 120 is drivingly engaged with the drive pinion 118. In an embodiment, the drive gear 120 is drivingly engaged with the drive pinion 118 via helical gearing.

The first motor generator 114 is in driving engagement with the driveshaft 116. The first motor generator 114 is in electrical communication with the control system and the power source. Depending on an electrical control of the first motor generator 114, the first motor generator 114 may apply force to propel or retard the driveshaft 116 and any other drivetrain components drivingly engaged therewith. Force is applied by the first motor generator 114 by converting electrical energy stored in the power source into kinetic energy by rotating the driveshaft 116 and any components drivingly engaged therewith. When the driveshaft 116 is retarded in response to electrical control by the control system, the first motor generator 114 generates electrical energy, which may be stored in the power source. An axis of the first motor generator 114 is generally parallel to an axis of the portal axle architecture 100.

The driveshaft 116 is a shaft assembly utilized to transmit power to and from the first motor generator 114 to the drive pinion 118. The drive shaft 116 comprises a first joint 140, a shaft section 142, and a second joint 144. The first joint 140 and the second joint 144 are respectively drivingly engaged with the first motor generator 114 and the drive pinion 118. As non-limiting examples, the first joint 140 and the second joint 144 may be Cardan joints, constant velocity joints, or other kinetic joints capable of transferring power to and from the first motor generator 114 to the drive pinion 118.

The drive pinion 118 is a gear mounted to the second joint 144 of the driveshaft 116. In an embodiment, the drive pinion 118 may be a helical gear. The drive pinion 118 may be supported by a portion (not depicted) of the wheel hub 112. A plurality of gear teeth formed on the drive pinion 118 are drivingly engaged with a plurality of gear teeth formed on the drive gear 120.

The drive gear 120 is a gear mounted to the wheel hub 112. In an embodiment, the drive gear 120 may be a helical gear. In response to a force applied by the drive pinion 118, the drive gear 120 applies a rotational force to the wheel hub 112, and thus to the wheel 108. Similarly, force may be applied to the drive pinion 118 through the wheel 108. A gear cover (not depicted) may be coupled to the wheel hub 112 to enclose the drive pinion 118 and the drive gear 120. As a non-limiting example, a drive ratio of the drive pinion 118 to the drive gear 120 may be about 3 to 1. Further, a person having skill in the art should understand that additional reduction gearing can be added to the wheel hub 112 if an increased overall ratio is needed between the first motor generator 114 and the wheel 108.

The second electric drive assembly 106 comprises a second motor generator 122, a drive shaft 124, a drive pinion 126, and a drive gear 128. The second motor generator 122 is coupled with the chassis. An output of the second motor generator 122 is drivingly engaged with the driveshaft 124, and the driveshaft 124 is drivingly engaged with the drive pinion 126. The drive gear 128 is coupled with the wheel hub 112. Additionally, the drive gear 128 is drivingly engaged with the drive pinion 126. In an embodiment, the drive gear 128 is drivingly engaged with the drive pinion 126 via helical gearing.

The second motor generator 122 is in electrical communication with the control system and the power source. Depending on an electrical control of the second motor generator 122, the second motor generator 122 may apply a force to propel or retard the driveshaft 124 and any other drivetrain components drivingly engaged therewith. Force is applied by the second motor generator 122 by converting electrical energy stored in the power source into kinetic energy by rotating the driveshaft 124 and any components drivingly engaged therewith. When the driveshaft 124 is retarded in response to electrical control by the control system, the second motor generator 122 generates electrical energy, which may be stored in the power source. An axis of the second motor generator 122 is substantially parallel to an axis of the portal axle architecture 100.

The driveshaft 124 is a shaft assembly utilized to transmit power to and from the second motor generator 122 to the drive pinion 126. The drive shaft 124 comprises a first joint 150, a shaft section 152, and a second joint 154. The first joint 150 and the second joint 154 are respectively drivingly engaged with the second motor generator 122 and the drive pinion 126. As non-limiting examples, the first joint 150 and the second joint 154 may be Cardan joints, constant velocity joints, or other kinetic joints capable of transferring power to and from the second motor generator 122 to the drive pinion 126.

The drive pinion 126 is a gear mounted to the second joint 154 of the driveshaft 124. In an embodiment, the drive pinion 126 may be a helical gear. The drive pinion 126 may be supported by a portion (not depicted) of the wheel hub 112. A plurality of gear teeth formed on the drive pinion 126 are drivingly engaged with a plurality of teeth formed on the drive gear 128.

The drive gear 128 is a gear mounted to the wheel hub 112. In an embodiment, the drive gear 128 may be a helical gear. In response to a force applied by the drive pinion 126, the drive gear 128 applies a rotational force to the wheel hub 112 and, via the wheel hub 112, to the wheel 108. Similarly, force may be applied to the drive pinion 126 through the wheel 108. A gear cover (not depicted) may be coupled to the wheel hub 112 to enclose the drive pinion 126 and the drive gear 128. As a non-limiting example, a drive ratio of the drive pinion 126 to the drive gear 128 may be about 3 to 1. Further, a person having skill in the art should understand that additional reduction gearing can be added to the wheel hub 112 if an increased overall ratio is desired between the second motor generator 122 and the wheel 108.

The chassis mounted motor generators 114, 122 reduce an unsprung weight of the portal axle architecture 100 as compared to an axle mounted solution. In addition, mounting the motor generators 114, 122 on the chassis reduces the environmental impact thereon as compared to an axle mounted solution. Further, locating the motor generators 114, 122 on the chassis increases a distance between the outboard axle components. In an embodiment where the portal axle architecture is utilized with a bus, the increased distance between the outboard axle components allows for increased passenger space. Further, the suspension system 110 is a parallelogram trailing arm system, which creates installation commonality with current low floor buses.

Figure 2:
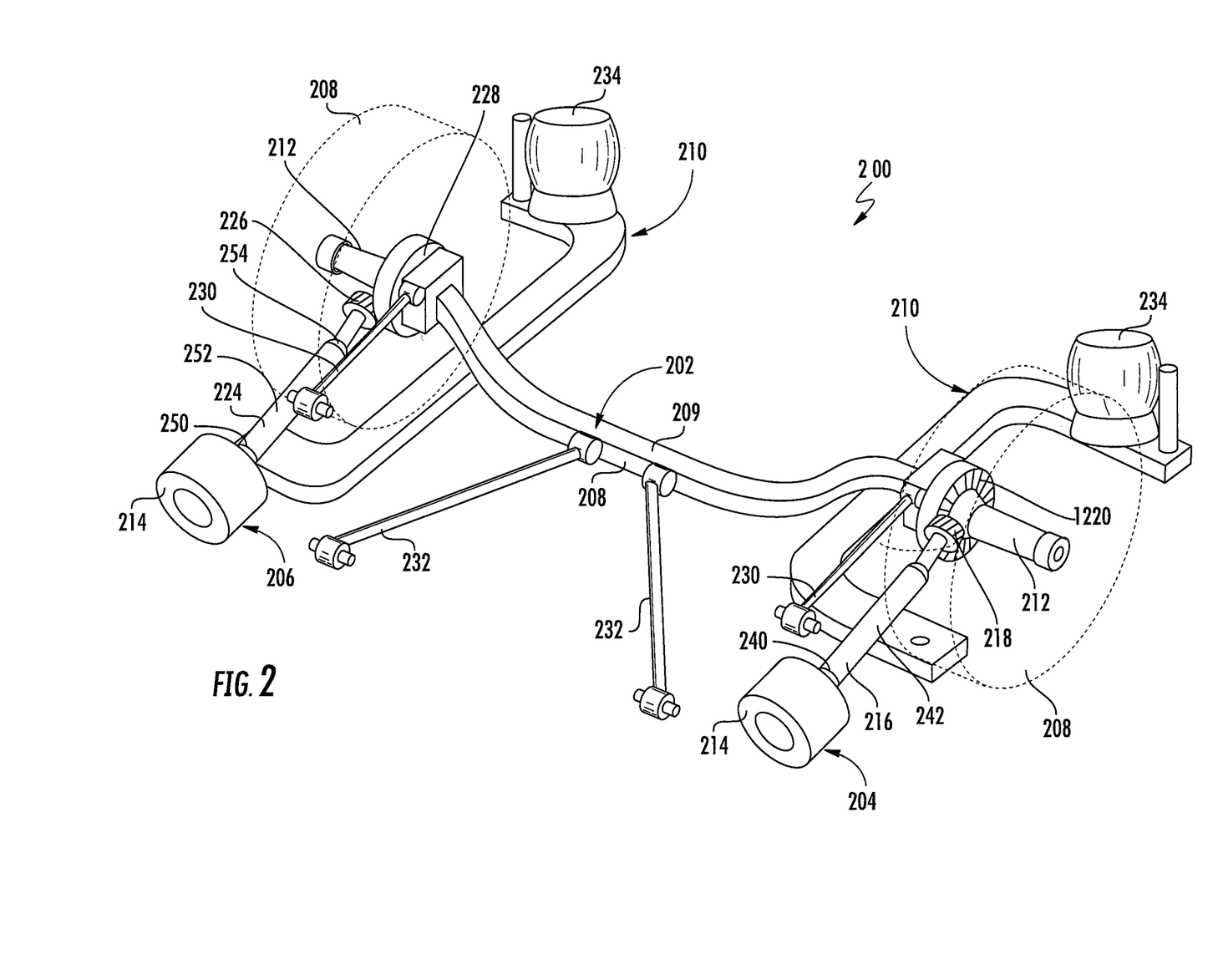
FIG. 2 is a perspective style view of an electric portal axle architecture according to another embodiment of the presently disclosed subject matter.

As illustrated in FIG. 2, a portal axle architecture 200, according to another embodiment of the presently disclosed subject matter, comprises a De Dion axle assembly 202. The portal axle architecture 200 also comprises a first electric drive assembly 204, and a second electric drive assembly 206. A pair of wheels 208 are rotatingly mounted on the De Dion axle assembly 202. The wheels 208 are drivingly engaged with the first electric drive assembly 204 and the second electric drive assembly 206, respectively. The first electric drive assembly 204 and the second electric drive assembly 206 are in electrical communication with a control system (not depicted) and a power source (not depicted). The control system may be a drive control system for the portal axle architecture 200 or for the vehicle in which the portal axle architecture 200 is incorporated. The power source may be a battery or another electrical source.

The De Dion axle assembly 202 comprises a De Dion tube 209 coupled with a suspension system 210. A pair of wheel hubs 212 are also coupled with the De Dion tube 209. Each of the wheel hubs 212 is rotatably mounted on an end of the De Dion tube 209 and provides a mounting location for each of the wheels 208. In the embodiment illustrated in FIG. 2, the suspension system 210 is a trailing arm suspension system including a first pair of trailing arms 230, a second pair of trailing arms 232, and air springs 234.

In an embodiment, the first trailing arms 230 are coupled with opposing ends of the De Dion axle assembly 202. The first trailing arms 230 may have a first end pivotally coupled with a portion (not depicted) of the De Dion axle assembly 202, and a second end pivotally coupled with a portion (not depicted) of the vehicle chassis. The second trailing arms 232 are coupled with a generally central portion of the De Dion axle assembly 202. The second trailing arms 232 may have a first end pivotally coupled with a center portion of the De Dion axle assembly 202, and a second end pivotally coupled with a portion (not depicted) of the vehicle chassis. The second trailing arms 232 extend outwardly from a center portion of the De Dion axle assembly 202 at an acute angle to the longitudinal axis of the vehicle. In addition, the second pair of trailing arms 232 is disposed below the first pair of trailing arms 230.

The first electric drive assembly 204 comprises a first motor generator 214, a drive shaft 216, a drive pinion 218, and a drive gear 220. The first motor generator 214 is coupled with the chassis. An output of the first motor generator 214 is drivingly engaged with the driveshaft 216. The driveshaft 216 is drivingly engaged with the drive pinion 218. The drive gear 220 is coupled with the wheel hub 212 and is drivingly engaged with the drive pinion 218. In an embodiment, the drive gear 220 is drivingly engaged with the drive pinion 218 via spiral bevel gearing.

The first motor generator 214 is in electrical communication with the control system and the power source. Depending on an electrical control of the first motor generator 214, the first motor generator 214 may apply force to propel or retard the driveshaft 216 and any other drivetrain components drivingly engaged therewith. The first motor generator 214 applies force by converting electrical energy, stored in the power source, into kinetic energy by rotating the driveshaft 216 and any components drivingly engaged therewith. When the driveshaft 216 is retarded in response to electrical control by the control system, the first motor generator 214 generates electrical energy, which may be stored in the power source. An axis of the first motor generator 214 is substantially transverse to an axis of the portal axle architecture 200.

The driveshaft 216 is a shaft assembly utilized to transmit power between the first motor generator 214 and the drive pinion 218. The drive shaft 216 comprises a first joint 240, a shaft section 242, and a second joint 244. The first joint 240 and the second joint 244 are drivingly engaged with the first motor generator 214 and the drive pinion 218, respectively. As non-limiting examples, the first joint 240 and the second joint 244 may be Cardan joints, constant velocity joints, or other kinetic joints capable of transferring power to and from the first motor generator 214 to the drive pinion 218.

The drive pinion 218 is a gear coupled with the second joint 244 of the driveshaft 216. In an embodiment, the drive pinion 218 may be a spiral bevel gear. The drive pinion 218 may be supported by a portion (not depicted) of the wheel hub 212. A plurality of gear teeth formed on the drive pinion 218 are drivingly engaged with a plurality of gear teeth formed on the drive gear 220.

The drive gear 220 is a gear mounted to the wheel hub 212. In an embodiment, the drive gear 220 may be a spiral bevel gear. In response to a force applied by the drive pinion 218, the drive gear 220 applies a rotational force to the wheel hub 212, and to the wheel 208 via the wheel hub 212. Similarly, force may be applied to the drive pinion 218 through the wheel 208. A gear cover (not depicted) may be coupled with the wheel hub 212 to enclose the drive pinion 218 and the drive gear 220. As a non-limiting example, a drive ratio of the drive pinion 218 to the drive gear 220 may be about 6 to 1. Further, it should be understood by a person having skill in the art that additional reduction gearing can be added to the wheel hub 212 if an increased overall ratio is desired between the first motor generator 214 and the wheel 208.

The second electric drive assembly 206 comprises a second motor generator 222, a drive shaft 224, a drive pinion 226, and a drive gear 228. The second motor generator 222 is coupled with the chassis. An output of the second motor generator 222 is drivingly engaged with the driveshaft 224. The driveshaft 224 is drivingly engaged with the drive pinion 226. The drive gear 228 is coupled with the wheel hub 212. The drive gear 228 is drivingly engaged with the drive pinion 226. In an embodiment, the drive gear 228 is drivingly engaged with the drive pinion 226 through spiral bevel gearing.

The second motor generator 222 is in electrical communication with the control system and the power source. Depending on an electrical control of the second motor generator 222, the second motor generator 222 may apply force to propel or retard the driveshaft 224 and any other drivetrain components drivingly engaged therewith. The second motor generator 222 applies force by converting electrical energy, stored in the power source, into kinetic energy by rotating the driveshaft 224 and any components drivingly engaged therewith. When the driveshaft 224 is retarded in response to electrical control by the control system, the second motor generator 222 generates electrical energy, which may be stored in the power source. An axis of the second motor generator 222 is substantially transverse to an axis of the portal axle architecture 200.

The driveshaft 224 is shaft assembly for transmitting power to and from the second motor generator 222 to the drive pinion 226. The drive shaft 224 comprises a first joint 250, a shaft section 252, and a second joint 254. The first joint 250 and the second joint 254 are drivingly engaged with the second motor generator 222 and the drive pinion 226, respectively. As non-limiting examples, the first joint 250 and the second joint 254 may be Cardan joints, constant velocity joints, or other kinetic joints capable of transferring power to and from the second motor generator 222 to the drive pinion 226.

The drive pinion 226 is a gear mounted to the second joint 254 of the driveshaft 224. In an embodiment, the drive pinion 226 may be a spiral bevel gear. The drive pinion 226 may be supported by a portion (not depicted) of the wheel hub 212. A plurality of gear teeth formed on the drive pinion 226 are drivingly engaged with a plurality of gear teeth formed on the drive gear 228.

The drive gear 228 is a gear mounted to the wheel hub 212. In an embodiment, the drive gear 228 may be a spiral bevel gear. In response to a force applied by the drive pinion 226, the drive gear 228 applies a rotational force to the wheel hub 212, and via the wheel hub 212 to the wheel 208. Similarly, force may be applied to the drive pinion 226 through the wheel 208. A gear cover (not depicted) may be coupled to the wheel hub 212 to enclose the drive pinion 226 and the drive gear 228. As a non-limiting example, a drive ratio of the drive pinion 226 to the drive gear 228 may be about 6 to 1. Further, it should be understood by a person having skill in the art that additional reduction gearing can be added to the wheel hub 212 if an increased overall ratio is required between the second motor generator 222 and the wheel 208.

The chassis mounted motor generators 214, 222 reduce an unsprung weight of the portal axle architecture 200 and create a less harsh environment for the operation of the motor generators 214, 222 as compared to an axle mounted solution. Disposing the motor generators 214, 222 on the chassis increases a distance between the outboard axle components. In an embodiment where the portal axle architecture 200 is mounted on a bus, increased distance between the outboard axle components allows for increased passenger envelope space. Further, the suspension system 210 is a parallelogram trailing arm system, which creates installation commonality with current low floor buses.

Figure 3:
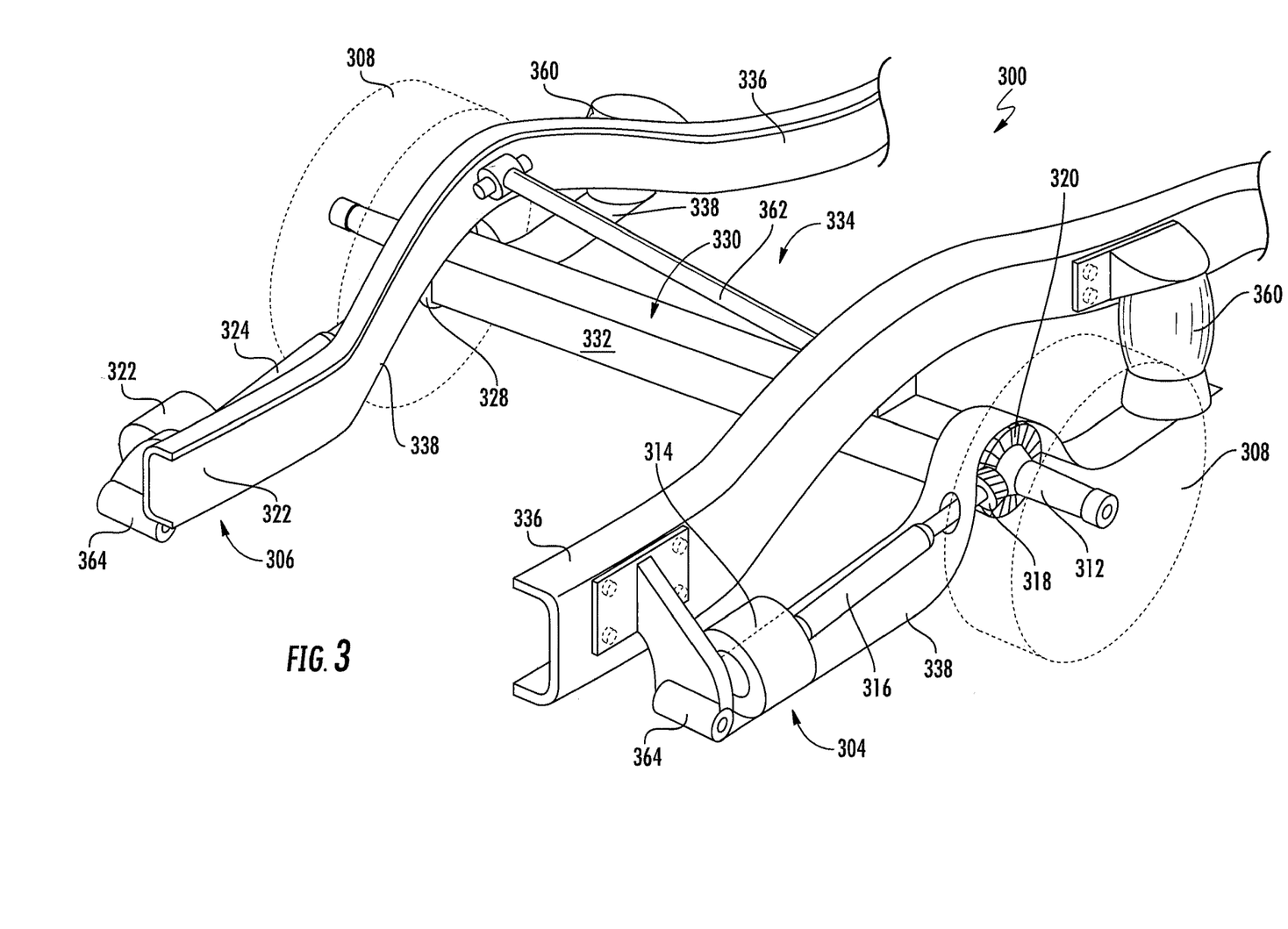
FIG. 3 is a perspective style view of an electric portal axle architecture according to another embodiment of the presently disclosed subject matter.

As illustrated in FIG. 3, a portal axle architecture 300 has features similar to the portal axle architecture 200. Features of the portal axle architecture 300 similar to the portal axle architecture 200 are similarly identified by reference numbers in series. Different and additional features of the portal axle architecture 300 are described intra and can be appreciated by one skilled in the art in view of FIG. 2 and the other embodiments of the presently disclosed subject matter illustrated and described in this disclosure.

The portal axle architecture 300 comprises a De Dion beam axle assembly 330, a first electric drive assembly 304, and a second electric drive assembly 306. A pair of wheels 308 are rotatably coupled with the De Dion beam axle assembly 330. The wheels 308 are drivingly engaged with the first electric drive assembly 304 and the second electric drive assembly 306, respectively. The first electric drive assembly 304 and the second electric drive assembly 306 are in electrical communication with a control system (not depicted) and a power source (not depicted). The control system may be a drive control system for the portal axle architecture 300 or for the vehicle in which the portal axle architecture 300 is incorporated. The power source may be a battery or another electrical source.

The De Dion beam axle assembly 330 comprises a straight beam axle 332 coupled with a suspension system 334 and a pair of wheel hubs 312. Each of the wheel hubs 312 is rotatably coupled with an end of the straight beam axle 332 and provides a mounting location for each of the wheels 308. In an embodiment, the suspension system 334 is a trailing arm suspension system coupled with a vehicle frame 336. The suspension system 334 includes trailing arms 338, air springs 360, and a track rod 362. A first end of the track rod 362 is pivotally coupled with the De Dion beam axle assembly 330, and a second end of the track rod 362 is pivotally coupled with the vehicle frame 336.

The first electric drive assembly 304 and the second electric drive assembly 306 are respectively mounted to the trailing arms 338 of the suspension system 334. The trailing arms 338 are pivotally coupled with the vehicle frame 336 via pivots 364. The trailing arms 338 are disposed generally parallel to a longitudinal axis of the vehicle and extend behind the De Dion beam axle assembly 330. The air springs 360 are coupled an upper surface of the trailing arms 338, respectively.

As illustrated in FIG. 3, the first and second electric drive assembly shafts 316, 324 may be disposed through apertures in the trailing arms 338, respectively. In an embodiment, the shafts 316, 324 may be rotatably supported in the trailing arm 338 apertures.

Figure 4:
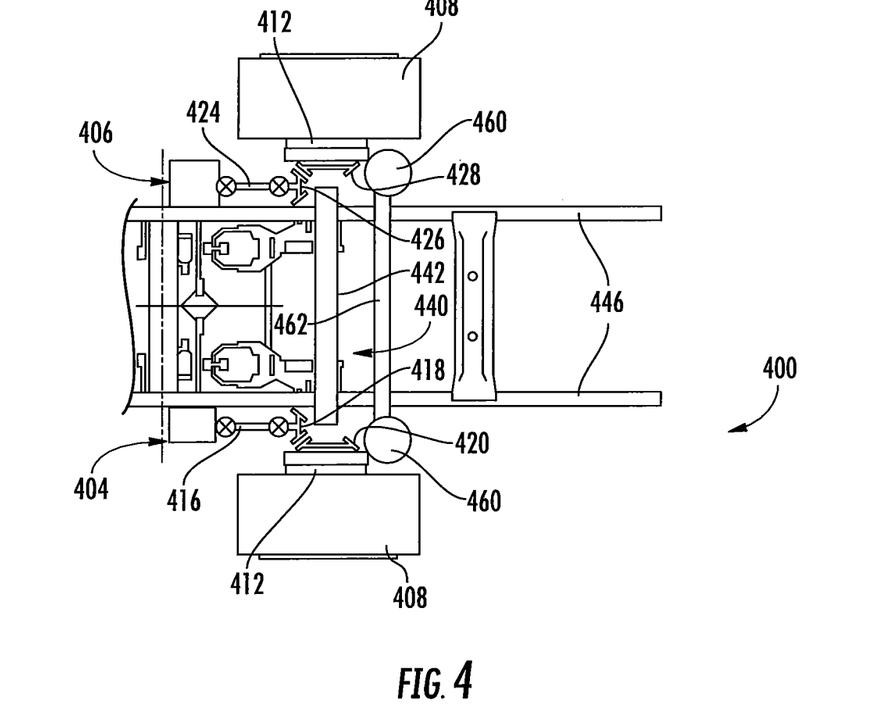
FIG. 4 is a plan view of an electric axle architecture for use with a trailing arm suspension according to another embodiment of the presently disclosed subject matter.
Figure 5:
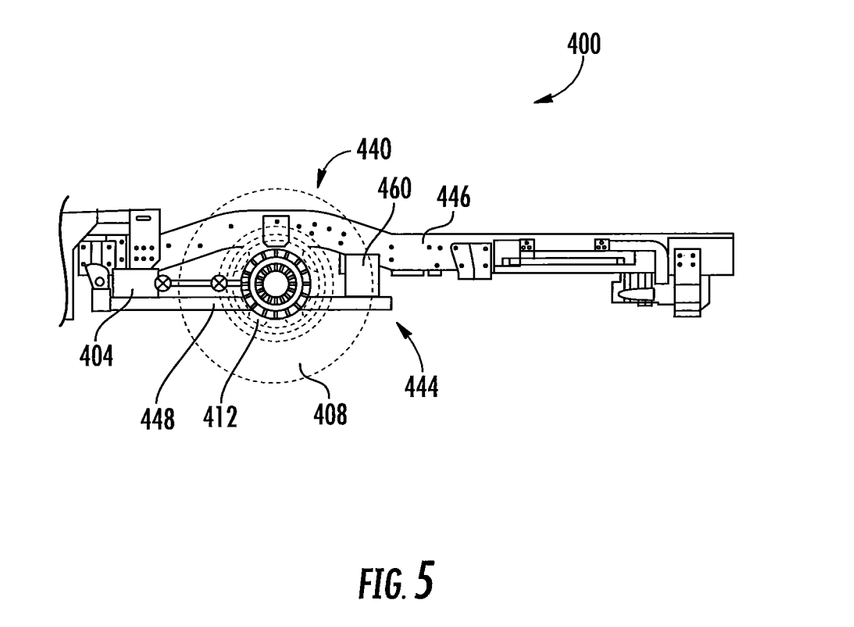
FIG. 5 is a plan view of the electric axle architecture of FIG. 4.

FIGS. 4 and 5 illustrate a portal axle architecture 400 according to another embodiment of the presently disclosed subject matter. The portal axle architecture 400 is a variation of the portal axle architecture 200, and has similar features thereto. The embodiment of the presently disclosed subject matter shown in FIGS. 4 and 5 includes similar components to the electric drivetrain 200. Similar features of the embodiment shown in FIGS. 4 and 5 are numbered similarly in series. Different and additional features of the embodiment shown in FIGS. 4 and 5 are described hereinbelow and can be appreciated by one skilled in the art.

In an embodiment, the portal axle architecture 400 comprises a straight beam axle assembly 440, a first electric drive assembly 404, and a second electric drive assembly 406. A pair of wheels 408 are rotatably coupled with the straight beam axle assembly 440. The wheels 408 are drivingly engaged with the first electric drive assembly 404 and the second electric drive assembly 406, respectively. The first electric drive assembly 404 and the second electric drive assembly 406 are in electrical communication with a control system (not depicted) and a power source (not depicted). The control system may be a drive control system for the portal axle architecture 400 or for the vehicle in which the portal axle architecture 400 is incorporated. The power source may be a battery or another electrical source.

The straight beam axle assembly 440 comprises a straight beam axle 442 coupled with a suspension system 444 and a pair of wheel hubs 412. Each of the wheel hubs 412 is rotatably mounted on an end of the straight beam axle 442 and provides a mounting location for each of the wheels 408. In an embodiment, the suspension system 444 is a trailing arm suspension system mounted to a vehicle frame 446 including trailing arms 448, air springs 460, and an axle flex beam 462.

The trailing arms 448 are pivotally coupled with the vehicle frame 446. The trailing arms 448 extend behind straight beam axle assembly 440. The axle flex beam 462 is coupled with the ends of the trailing arms 448 which extend behind the straight beam axle assembly 440. The air springs 460 are coupled with the trailing arms 448 and the axle flex beam 462.

In another embodiment (not depicted), the portal axle architecture 400 may not include the straight beam axle assembly 440. In this embodiment, the wheel hubs 412 are rotatably coupled with the vehicle frame 446. Lateral stabilization of the vehicle frame 446 is controlled, at least in part, by the axle flex beam 462.

As illustrated in FIGS. 4 and 5, the first electric drive assembly 404 and the second electric drive assembly 406, respectively, are mounted to the trailing arms 448 of the suspension system 444. The suspension system 444 provides motor generators 414, 422 packaged on the trailing arms 448 close to a pivot point. The portal axle architecture 400 reduces an overall cost of the axle and a weight is reduced compared to current portal axle products of similar capability. Mounting the motor generators 414, 422 on the chassis mounted trailing arms 448 substantially eliminates flexing of the electrical cable used with the motor generators 414, 422 during articulation of the suspension system 444. Mounting the motor generators 414, 422 on the trailing arms 448 also reduces a vertical acceleration shock loading on the motor generators 414, 422 due to road irregularities. Torque vectoring and limited slip differential functionality are possible due to the use of the motor generators 414, 422 for each wheel when the necessary control system is utilized. In an embodiment, the portal axle architecture 400 can be used with single drive 4×2 buses and tandem drive 6×4 buses, such as articulated bus designs.

Other benefits of the portal axle architecture 100, 200, 300, 400 can be appreciated in view of the preceding disclosure. A traditional parallelogram arm suspension or trailing arm suspension is utilized with, the portal axle architecture 100, 200, 300, 400 to control axle movement. Traditional outboard air springs are utilized to allow an optimal ride frequency (stiffness) versus roll stiffness.

The solid beam axle 109, 209 having a large drop dimension, and the straight beam axle 332, 442 are utilized to support the wheel ends. Individual outboard gear drives are utilized for each wheel 108, 208, 308, 408. Two chassis mounted motor generators 114, 122, 214, 222, 314, 322, 414, 422 are utilized, each one individually driving the wheel ends through the shafts 116, 124, 216, 224, 316, 324, 416, 424. The shaft 116, 124, 216, 224, 316, 324, 416, 424 has a similar articulation with respect to the suspension control arms allowing equal drive shaft joint angles as the suspension travels in jounce and rebound. The chassis mounted motor generators 114, 122, 214, 222, 314, 322, 414, 422 are rubber isolated to eliminate noise transmitted to the vehicle incorporating the portal axle architecture 100, 200, 300, 400. The outboard gear drive, service brake, air springs and wheel equipment are placed in a position as far as possible outboard to improve the passenger space between the portal axle wheel wells. In an embodiment, wide based single tires are utilized to increase an effective track width. Single reduction gearing of about 6:1 ratio is used with larger motors (~150-200 kW each) for city bus applications. Alternately, a double reduction with two speed capability and about 22:1 overall ratio can be utilized to downsize the motors (~100-125 kW each). A single inverter can be used to supply both motor generators due to their close proximity.

While various embodiments have been described above, it should be understood that they have been presented by way of example, and not limitation. It will be apparent to persons skilled in the relevant arts that the disclosed subject matter may be embodied in other specific forms without departing from the spirit or essential characteristics thereof. The embodiments described above are therefore to be considered in all respects as illustrative, not restrictive.

What is claimed is:

1. An electric vehicle comprising:
    a vehicle frame;
    a portal axle assembly including a De Dion tube;
    a first wheel hub and a second wheel hub rotatably coupled with said De Dion tube;
    a suspension system coupled with said vehicle frame, said suspension system comprising:
        a first pair of trailing arms pivotally coupled with said vehicle frame, wherein the first pair of trailing arms extends in a rearward direction;
        a second pair of trailing arms pivotally coupled with said vehicle frame;
        at least one pair of air springs, wherein the air springs are coupled to an upper surface of the trailing arms;
    a first electric drive assembly in driving engagement with said first wheel hub; and
    a second electric drive assembly in driving engagement with said second wheel hub, said first electric drive assembly disposed substantially transverse to said portal axle assembly and wherein each of the first and second electric drive assemblies is respectively disposed outboard of each of said first and second pairs of trailing arms.

2. The electric vehicle according to claim 1, said first electric drive assembly comprising:
    a first motor generator coupled with said vehicle frame;
    a first joint coupled with said first motor generator;
    a shaft coupled with said first joint;
    a second joint coupled with said shaft;
    a pinion gear coupled with said second joint; and
    a drive gear in driving engagement with said pinion gear and coupled with said first wheel hub.

3. The electric vehicle according to claim 2, wherein: said first electric drive assembly is coupled with said vehicle frame.

4. The electric vehicle according to claim 1, said second electric drive assembly comprising:
    a second motor generator coupled with said vehicle frame;
    a third joint coupled with said second motor generator;
    a second shaft coupled with said third joint;
    a fourth joint coupled with said second shaft;
    a second pinion gear coupled with said fourth joint; and
    a second drive gear in driving engagement with said second pinion gear and coupled with said second wheel hub.

5. The electric vehicle according to claim 4, wherein: said first electric drive assembly is disposed substantially transverse to said portal axle assembly, and said first electric drive assembly is coupled with said vehicle frame.

6. The electric vehicle according to claim 1, said suspension system further comprising: a track rod having a first end coupled with said De Dion tube, and a second end coupled with said vehicle frame.

7. The electric vehicle according to claim 1, wherein said second pair of trailing arms has a first end pivotally coupled with said portal axle assembly and a second end pivotally coupled with said vehicle frame.

8. The electric vehicle according to claim 1, wherein: said first pair of trailing arms is disposed at least partially above said portal axle assembly.

9. The electric vehicle according to claim 8, wherein: said first electric drive assembly is disposed on one of said first pair of trailing arms.

10. The electric vehicle according to claim 8, wherein: an axle flex beam is disposed between and coupled with said first pair of trailing arms.

11. The electric vehicle according to claim 9, wherein: said second electric drive assembly is disposed on one of said first pair of trailing arms.

12. The electric vehicle according to claim 11, wherein: a first torque transfer shaft of the first electric drive assembly is disposed through one of said first pair of trailing arms, and a second torque transfer shaft of the second electric drive assembly is disposed through one of said first pair of trailing arms.

\* \* \* \* \*